(12) United States Patent
Morrow

(10) Patent No.: US 6,338,691 B1
(45) Date of Patent: Jan. 15, 2002

(54) GEARING FOR POWER SHARING IN PLANETARY TRANSMISSION

(75) Inventor: William Bruce Morrow, Santa Barbara, CA (US)

(73) Assignee: Harrier Technologies, Inc., Greenwich, CT (US)

( * ) Notice: Subject to any disclaimer, the term of this patent is extended or adjusted under 35 U.S.C. 154(b) by 0 days.

(21) Appl. No.: 09/696,706

(22) Filed: Oct. 25, 2000

Related U.S. Application Data

(62) Division of application No. 09/354,981, filed on Jul. 16, 1999, now Pat. No. 6,179,743.

(51) Int. Cl.[7] ............................................. F16H 37/14
(52) U.S. Cl. ..................... 475/219; 475/335; 475/348; 475/344; 74/665 GD
(58) Field of Search ................................ 475/219, 335, 475/337, 348, 344; 74/665 GD

(56) References Cited

U.S. PATENT DOCUMENTS

| | | | |
|---|---|---|---|
| 813,461 A | 2/1906 | Stacks | ........................ 475/219 |
| 1,070,589 A | 8/1913 | Duffing | |
| 1,273,556 A | 7/1918 | Warriner | |
| 1,320,459 A | 11/1919 | Edwards | |
| 1,399,549 A | 12/1921 | Fast | ........................ 475/348 X |
| 1,425,430 A | 8/1922 | Wikander | ..................... 475/337 |
| 1,479,157 A | 1/1924 | Short | |
| 3,245,279 A | 4/1966 | Baker | ..................... 475/348 X |
| 3,592,078 A | 7/1971 | Stark | ........................ 74/665 GD |
| 4,391,163 A | 7/1983 | Benthake et al. | ........... 475/337 |
| 4,612,816 A | 9/1986 | Chalik | |
| 4,641,543 A | 2/1987 | Jessup | |
| 4,869,139 A | 9/1989 | Gotman | .................. 475/337 X |
| 5,472,383 A | 12/1995 | McKibbin | ............... 475/344 X |

FOREIGN PATENT DOCUMENTS

| | | | |
|---|---|---|---|
| DE | 42 16 400 | 11/1993 | ................. 475/344 |
| GB | 1061422 | * 3/1967 | ................. 475/344 |
| SU | 1557394 | * 4/1990 | ................. 475/344 |

* cited by examiner

Primary Examiner—Charles A Marmor
Assistant Examiner—Ha Ho
(74) Attorney, Agent, or Firm—Kenyon & Kenyon

(57) ABSTRACT

A planetary gear transmission has two or more planetary gear sets in the gear train. Each planetary gear set comprises a sun gear mounted on a sun shaft with the sun gear engaging a plurality of planet gears mounted on a planet gear carrier with the plurality of planet gears engaging a ring gear mounted on the transmission housing. Each gear of the planetary gear transmission is a helical cut gear. Sun gears and/or ring gears are mounted for axial movement with respect to the transmission. Thrust imbalances on the sun gears and/or ring gears resulting from uneven loading and the helical cut result in sun gears and/or ring gears moving in the axial direction to eliminate the thrust imbalances and thereby resulting in equal loading or power sharing amongst the planetary gear sets.

5 Claims, 7 Drawing Sheets

GEARING FOR POWER SHARING IN PLANETARY TRANSMISSION

This application is a divisional application under 37 C.F.R. §1.53 (b) of prior application Ser. No. 09/354,981 filed Jul. 16, 1999, now U.S. Pat. No. 6,179,743. The disclosures of the specification, claims, drawings and abstract of application Ser. No. 09/354,981 are incorporated herein by reference.

FIELD OF THE INVENTION

The present invention is directed to improvements in planetary transmissions. More particularly, the present invention is directed to planetary gear transmissions having multiple planetary gear sets employing helical cut gears for providing power sharing amongst the planetary gear sets.

BACKGROUND OF THE INVENTION

Planetary gear trains have the advantage over pinion type gearing by permitting higher power densities, large gear ratios, and concentric power input and output. Increased power requirements in planetary gear trains are usually accommodated by increasing the diameter and width of the gears. If there are restrictions on the diametrical size of the gear train, increases in power can be met only by increasing the width of the gears or upping the material and machining specifications. There are practical limits to both these approaches.

An apparent solution for increasing power capacity within a limited diametric size is to add more gear sets to the train so that power is shared between more than one gear set. This results in a lesser load for each gear set but a higher total power capacity. However, there are severe practical problems with such a solution. This solution requires nearly perfect power sharing among the several gear sets. Such perfect power sharing among the gear sets would require manufacturing tolerances for the gears which are not practical for the vast majority of commercial applications. Practical manufacturing tolerances for the gears would result in uneven power sharing. Such uneven power sharing or uneven loading results in one set of gears being loaded more heavily than its designed for. This results in excessive wear and/or premature failure.

Gear transmissions having pairs of helical gears mounted on a drive shaft for engagement with respective pairs of helical gears mounted on a driven shaft are disclosed in copending U.S. patent application Ser. No. 09/167,760 filed Oct. 7, 1998 entitled Improvements In Power Sharing Gear Sets. The disclosures, including the disclosures of the specification and drawings, of prior U.S. patent application Ser. No. 09/167,760 filed Oct. 7, 1998, are hereby expressly incorporated by reference into this present application. The use of paired helical gears in multi-speed automotive transmissions is disclosed in U.S. patent application Ser. No. 09/187,905 filed Nov. 6, 1998 entitled Multi-Speed Automotive Transmission Using Paired Helical Gearing. The disclosures, including the disclosures of the specification and drawings, of prior U.S. patent application Ser. No. 09/187,905 filed Nov. 6, 1998 are hereby expressly incorporated by reference into this present application.

OBJECTS OF THE INVENTION

It is an object of the present invention to provide a planetary transmission providing a balanced load or balanced power sharing between two or more planetary gear sets.

It is also an object of the present invention to provide a planetary transmission which is compact in diametrical size but has high power capacity.

It is a further object of the present invention to provide a planetary transmission using helical gears for providing a balanced load or balanced power sharing between two or more planetary gear sets.

These and other objects of the present invention will become apparent from the following description and claims read in conjunction with the drawings.

SUMMARY OF THE INVENTION

The present invention is directed to a planetary gear transmission having multiple planetary gear sets employing helical cut gears.

Each planetary gear set in the gear train comprises a sun gear mounted on a sun shaft with the sun gear engaging a plurality of planet gears mounted in a planet gear carrier with the plurality of planet gears engaging a ring gear mounted on the transmission housing. The planet gear carrier may be the drive member with the sun shaft being the driven member. Conversely, the sun shaft may be the drive member with the planet gear carrier being the driven member.

The planetary gear transmission of the present invention employs helical cut gears for the sun gears, ring gears, and planet gears of the planetary gear sets to obtain practical balanced power sharing and load between two or more planetary gear sets in the gear train.

Helical gears, due to the helical angle of the gear cut, experience axial thrust when loaded. The magnitude of this axial thrust is directly proportional to the torque load on the gear. Power sharing and balanced load between planetary gear sets of the planetary gear transmission of the present invention is achieved by employing this axial thrust reaction and the resulting axial movement of sun gears and/or ring gears of adjacent planetary gear sets wherein sun gears and/or ring gears of adjacent planetary gear sets are mounted for axial movement with respect to the planetary transmission housing. If one of the planetary gear sets is more heavily loaded than the others, the axial thrust on the helical sun gear and helical ring gear of that set is not balanced with the axial thrust loads on the other planetary gear sets. The sun gear and/or the ring gear that is more heavily loaded, and thus experiencing a greater axial thrust load, moves axially in response to this thrust imbalance so as to achieve equal load sharing between planetary gear sets and no axial thrust imbalances.

The planet gears do not move axially during the operation of the planetary gear transmission. The axial thrust on a given planet gear due to interaction with a respective sun gear is equal and opposite to the axial thrust due to interaction with a respective ring gear. Therefore, the axial forces acting on a planet gear are equal and opposite resulting in no tendency for planet gears to move axially.

BRIEF DESCRIPTION OF THE DRAWINGS

In the drawings forming part hereof.

In order to provide a more complete understanding of the present invention and an appreciation of its advantages, a detailed description of preferred embodiments is provided below.

DETAILED DESCRIPTION

For a detailed explanation of the forces acting upon pairs of helical cut gears and load sharing and load balancing amongst pairs of helical cut gears, reference is made to the previously identified U.S. patent application Ser. No. 09/167,760 filed Oct. 7, 1998 entitled Improvements In Power Sharing Gear Sets, the disclosure of which is incorporated herein by reference.

Figure 1:
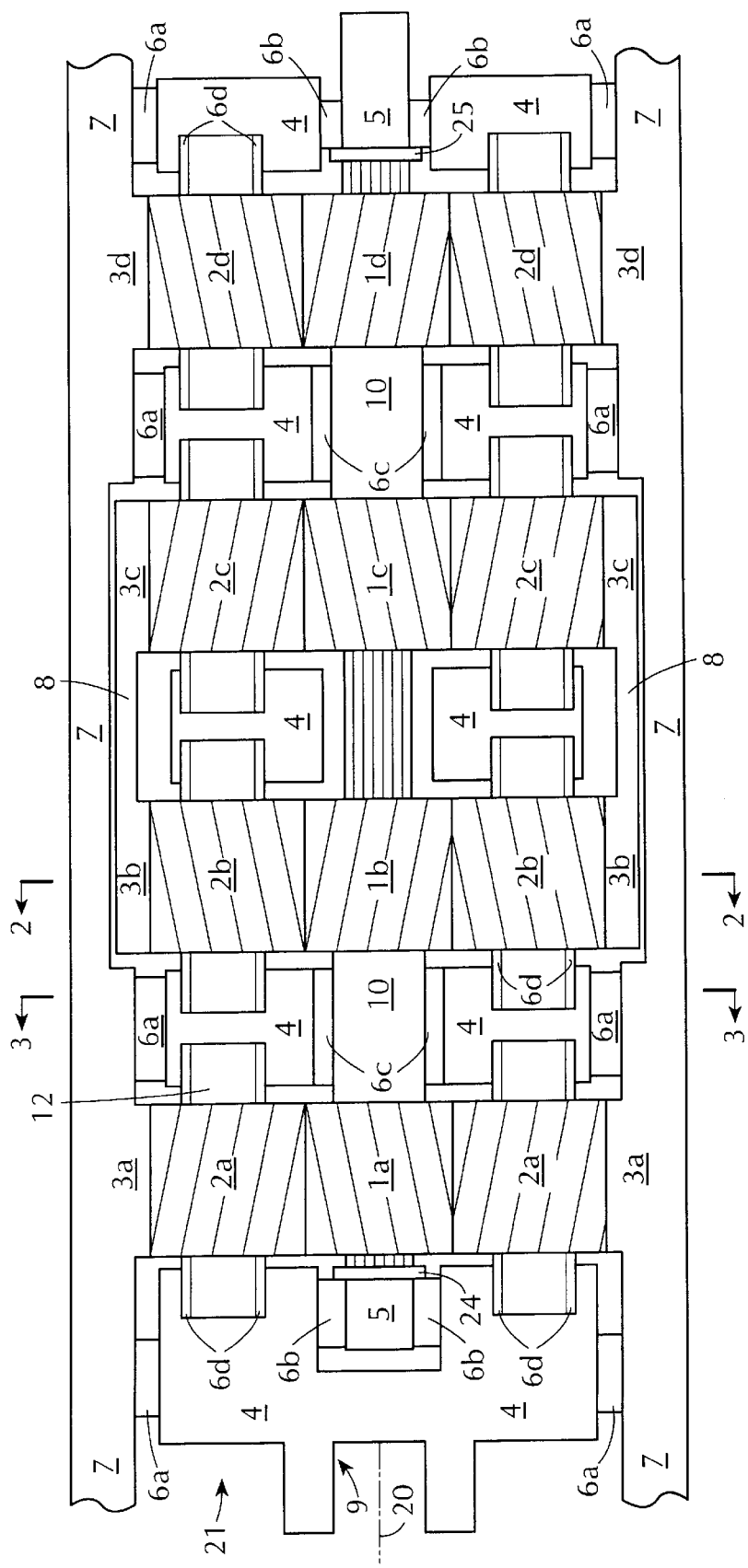
FIG. 1 is an illustrative schematic side elevation view of a planetary gear transmission in accordance with one embodiment of the present invention with parts removed for purposes of clarity of understanding.

Referring to FIG. 1 of the drawings, a planetary gear train with four planetary gear sets is illustrated in accordance with one embodiment of the present invention. It should be understood that the present invention may be practiced with two planetary gear sets or a plurality of planetary of planetary gear sets.

Figure 3:
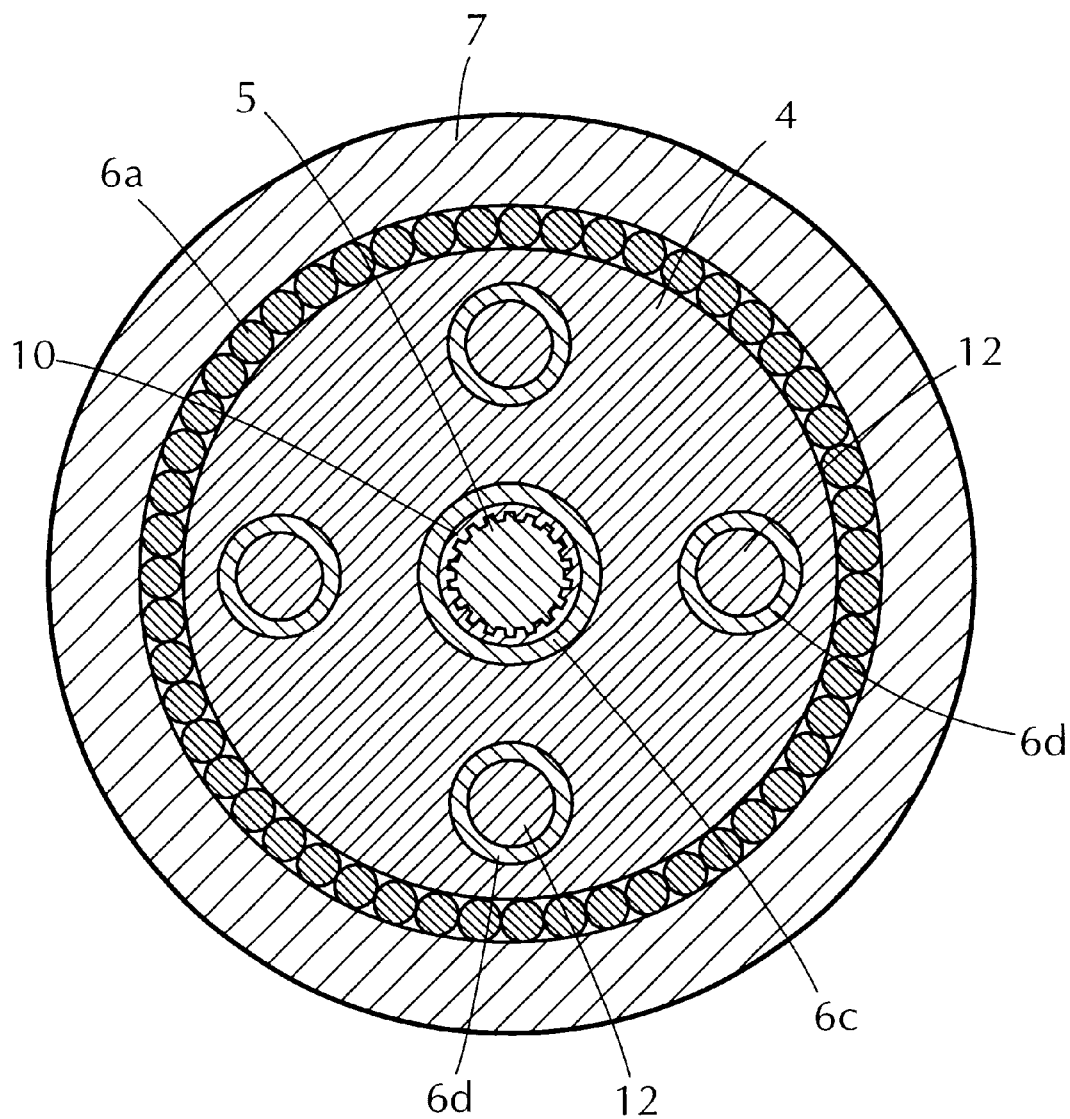
FIG. 3 is a schematic cross-sectional view along line 3—3 of FIG. 1.

With reference to FIG. 1, planet gear carrier 4 is mounted by bearings 6a, which may be, e.g., needle type bearings or roller bearings, in cylindrical transmission housing 7. Planet gear sets 2a, 2b, 2c, and 2d each comprise planet gears which are mounted for rotation in planet gear carrier 4. Planet gear carrier 4 holds planet gear sets 2a, 2b, 2c, and 2d in fixed relationship to one another. All the planet gears are free to turn or rotate independently of one another. With further reference to FIG. 3, in the illustrated embodiment, each planet gear has two planet shafts 12 which are received by a respective bore in planet gear holder 4 and the rotational mounting is accomplished by means, e.g., of journal bearings 6d. In one practical embodiment, each planet gear and its associated planet gear shafts 12 would be an integral member machined from a common stock material.

Planet gears 2a, 2b, 2c and 2d all have helical cut gear teeth. The helical cut of planet gears 2a (four in number as shown in the embodiment illustrated in FIG. 2) has a sense or hand and an angle with respect to the axial center line of the gear which is the same for each planet gear 2a. The helical cut for planet gears 2b has a sense or hand and an angle with respect to the axial center line of the gear which is the same for each planet gear 2b, but which is opposite to the sense or hand and angle of the helical cut of planet gears 2a. The helical cut for planet gears 2c has a sense or hand and an angle with respect to the axial center line of the gear which is the same for each planet gear 2c, but which is opposite to the sense or hand and angle of the helical cut of planet gears 2b. As is apparent, the sense or hand and the angle of the helical cut of planet gears 2c are the same as the sense or hand and angle of the helical cut of planet gears 2a.

The helical cut for planet gears 2d has a sense or a hand and an angle with respect to the axial center line of the gear which is the same for each planet gear 2d, but which is opposite to the sense or the hand and angle of the helical cut of planet gears 2c.

Cylindrical transmission housing 7 has a longitudinal central axis 20. Planet gear carrier 4 has a longitudinal central axis which is parallel to and coincident with the longitudinal central axis 20 of cylindrical transmission housing 7. The planet gears are mounted for rotation in planet gear carrier 4 by shafts 12 and bearings 6d in a manner which substantially prevents, during operation, movement of the planet gears in the direction of the longitudinal central axis of planet gear carrier 4. As will be apparent, planet gear carrier 4 rotates within cylindrical transmission housing 7 around longitudinal central axis 20. Planet gear carrier 4 is mounted for rotation in cylindrical transmission housing 4 by bearings 6a in a manner which substantially prevents during operation, movement of planet gear carrier 4 in the direction of the longitudinal central axis 20 of cylindrical transmission housing 7. Cylindrical transmission housing 7 has a first end 21 and a second end 22. Arm members 9 of planet gear carrier 4, located adjacent first end 21 of cylindrical transmission housing 7, is a mechanism which is connected to a power source (not illustrated) for inputting power into planet gear carrier 4 in embodiments where planet carrier 4 is a drive member or, conversely, outputs power from planet gear carrier 4 to a power output unit (not illustrated) in embodiments where planet carrier 4 is a driven member.

Figure 6:
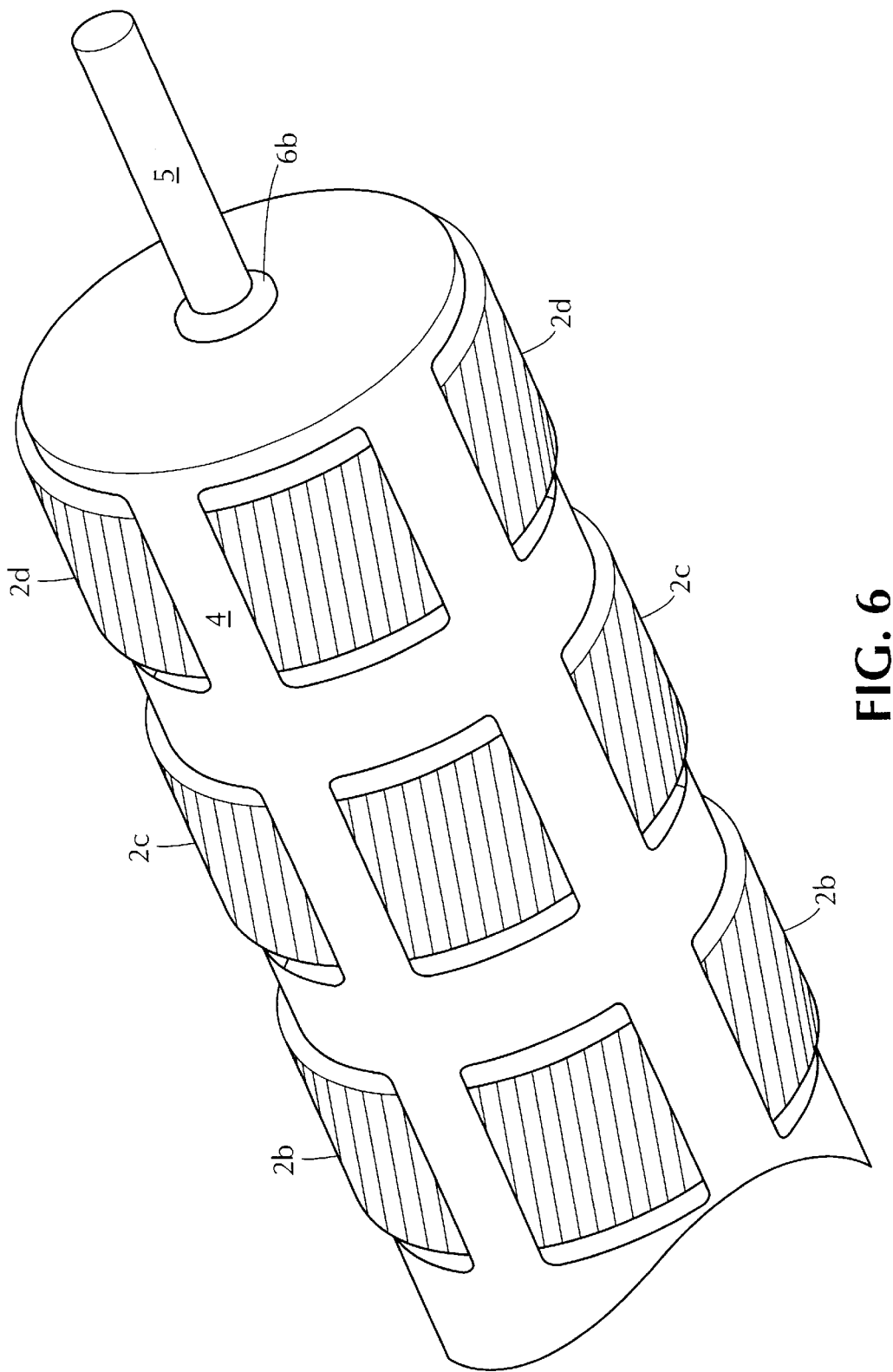
FIG. 6 is a partial schematic perspective view of a planet gear carrier removed from the transmission housing.

FIG. 6 is a partial schematic perspective view of planet gear carrier 4 removed from cylindrical transmission housing 7.

Sun shaft 5 has a first end adjacent to the first end 21 of cylindrical transmission housing 7 and is rotatably mounted in planet gear carrier 4 by bearing 6b, which may be a needle type or roller bearing. Sun shaft 5 is also rotatably mounted in planet gear carrier 4 at a second end of sun shaft 5 adjacent the second end 22 of cylindrical transmission housing 7 by bearing 6b, which may be a needle type bearing or a roller bearing. In some embodiments, a stop member or stop ring 24 may be mounted on sun shaft 5 at its first end and second end. Sun shaft 5 has a longitudinal central axis which is parallel to and coincident with longitudinal central axis 20 of cylindrical transmission housing 20. Sun shaft 5 is mounted in planet gear carrier 4 by bearings 6b in a manner which substantially prevents, during operation, movement of sun shaft 5 in the direction of the longitudinal central axis of planet gear carrier 4. If sun shaft 5 is a driven member, power is outputted to a power output unit (not illustrated) at the end of sun shaft 5 adjacent the second end 22 of cylindrical transmission housing 7. If sun shaft 5 is a drive member, a power source (not illustrated) would be connected to the end of sun shaft 5 adjacent the second end 22 of cylindrical transmission housing 7.

In the illustrated embodiment, sun shaft 5 is a splined shaft. Sun gears 1a, 1b, 1c and 1d are mounted on splined sun shaft 5 for movement in the axial direction of sun shaft 5.

Figure 2:
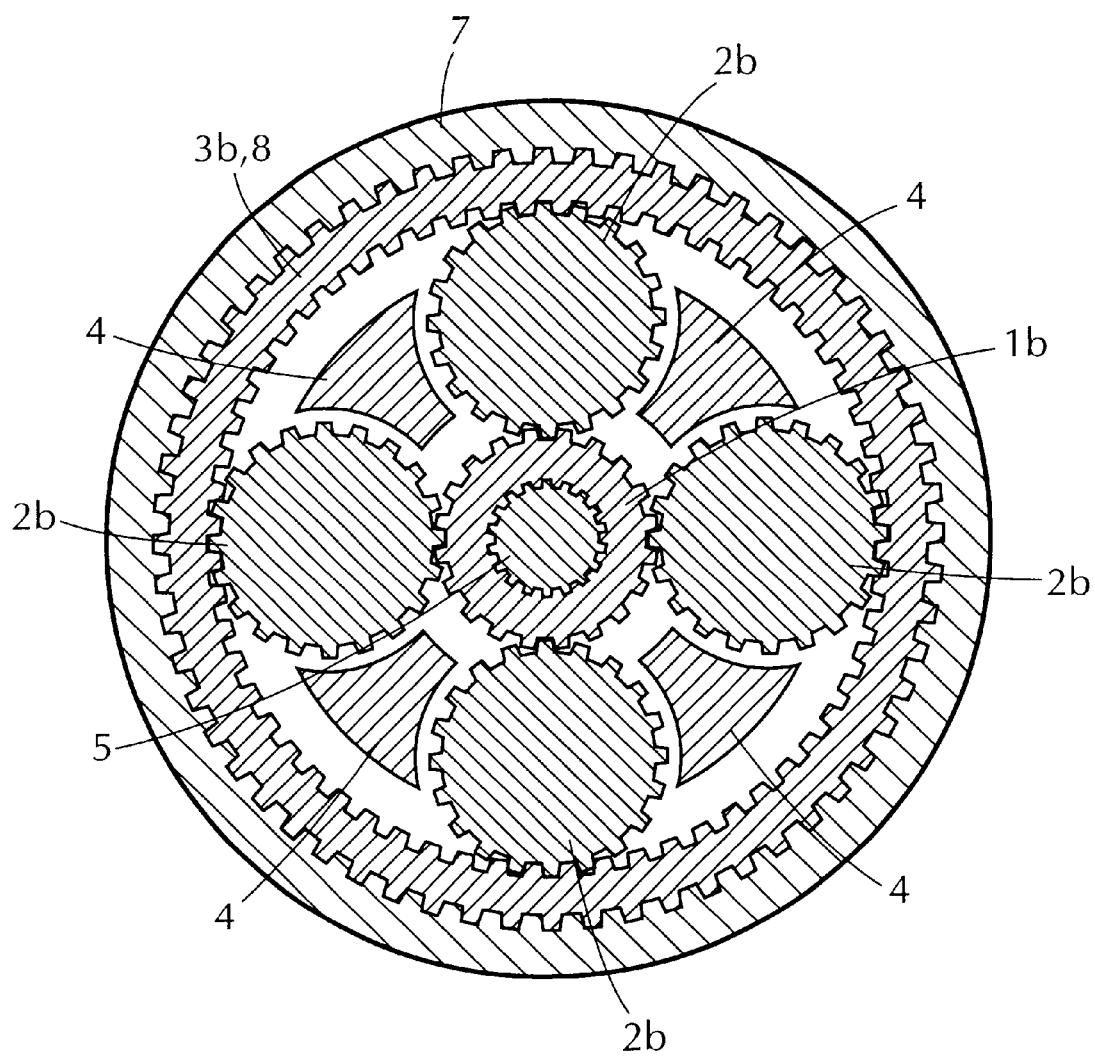
FIG. 2 is a schematic cross-sectional view along line 2—2 of FIG. 1.

As can be seen in FIG. 2, which is a schematic cross-section at 2—2 of FIG. 1, sun shaft 5 is a spline shaft having teeth engaging corresponding notches in sun gear 1b. The arrangement would be similar for sun gears 1a, 1c, and 1d. As will be appreciated, this spline shaft mounting results in the transmission of rotational movement and rotational power between the sun gears and the sun shaft. That is, the sun gears can drive the sun shaft 5 or the sun shaft 5 can drive the sun gears depending on the mode of operation. The spline shaft mounting also permits axial movement of the sun gears 1a, 1b, 1c, and 1d on the sun shaft 5. The illustrated embodiment of the use of a spline shaft for sun shaft 5 is by way of example and not limitation. Other mechanisms may be selected by one skilled in the art to mount the helical cut sun gears on the sun shaft for both transmission of rotational power and for permitting axial movement of the sun gears on the sun shaft, such as being keyed rather than splined.

Sun gears 1a, 1b, 1c, and 1d all have helical cut gear teeth. The helical cut of sun gear 1a has a sense or a hand an angle with respect to the sun shaft axis which is opposite to the sense or the hand and the angle of the helical cut of planet gears 2a of the first planet gear set. The helical cut of sun gear 1b has a sense or a hand and an angle with respect to the sun shaft axis which is opposite to the sense or the hand and the angle of the helical cut of the planet gears 2b of the second planet gear set. It will be appreciated by one skilled in the art that the sense or the hand and angle of the helical cut of sun gear 1a is opposite to the sense or the hand and angle of the helical cut of sun gear 1b. The helical cut of sun gear 1c has a sense or a hand and an angle with respect to the sun shaft axis which is opposite to the sense or the hand and the angle of the helical cut of planet gears 3c of the third planet gear set. It will be appreciated by one skilled in the art that the sense or the hand and the angle of the helical cut of sun gear 1c is the same as the sense or the hand and the angle of the helical cut of sun gear 1a. The helical cut of sun gear 1d has a sense or a hand and an angle with respect to the axis of the sun shaft which is opposite to the sense or the hand and the angle of the helical cut of planet gears 2d of the fourth planet gear set.

The helical teeth of sun gears 1a, 1b, 1c, and 1d respectively engage the helical teeth of the planet gears 2a of the first planet gear set, planet gears 2b of the second planet gear set, planet gears 2c of the third planet gear set, and planet gears 2d of the fourth planet gear set. FIG. 2 illustrates the gear teeth of sun gear 1b engaging the gear teeth of the four planet gears 2b of the second planet gear set.

In the embodiment of the present invention illustrated in FIG. 1, a cylindrical member 10 is disposed between sun gear 1a and sun gear 1b and a cylindrical member is disposed between sun gear 1c and sun gear 1d. In the embodiment illustrated in FIG. 3, the spline shaft teeth of sun shaft 5 engage corresponding notches in cylindrical member 10. It is not necessary for cylindrical member 10 to have notches engaging the spline of sun shaft 5. The interior of cylindrical member 10 could be smooth resting on the spline of sun shaft 5. Cylindrical member 10 is mounted so that it can move on sun shaft 5 in the axial direction of sun shaft 5.

As will hereinafter be discussed, in one mode of operation, forces created by rotation and the helical cut of the gears cause sun gear 1a and sun gear 1b to tend to move toward one another and to move together on sun shaft 5 and sun gear 1c and sun gear 1d to tend to move toward one another and to move together on sun shaft 5. Cylindrical member 10 between sun gear 1a and sun gear 1b restrains sun gears 1a and 1b from moving toward one another, while permitting sun gears 1a and 1b to move together as a unit on sun shaft 5. Likewise, cylindrical member 10 between sun gear 1c and sun gear 1d restrains sun gears 1c and 1d from moving toward one another, while permitting sun gears 1c and 1d to move together as a unit on sun shaft 5. By this movement, load is balanced between sun gear 1a and sun gear 1b and respective planet gears 2a of the first planet gear set and planet gears 2b of the second planet gear set. Load is also balanced between sun gear 1c and sun gear 1d and respective planet gears 2c of the third planet gear set and planet gears 2d of the fourth planet gear set. It will be appreciated that in such a mode of operation or such an embodiment, cylindrical body 10 does not have to be a separate member. Sun gears 1a and 1b and cylindrical member 10 could be machined from the same stock of material. The same would apply to sun gears 1c and 1d and associated cylindrical member 10.

As a practical matter, one skilled in the art may find it useful to mount cylindrical member 10 to the planet carrier 4 by bearings 6c, which may be, e.g., journal bearings. This provided additional support for sun shaft 5. Ring-like retainer members 24 are shown mounted on the first end and the second end sun shaft 5. Ring-like retainer members 24 are mounted on the ends of sun shaft 5 in a manner that they are restrained from movement in the axial direction of sun shaft 5.

In the embodiment illustrated in FIG. 1, a cylindrical ring-like member 3a is illustrated machined in the interior circumferential surface of the cylindrical transmission housing 7. The interior circumferential surface of ring-like member 3a has a helical gear cut with a helical sense or hand and angle with respect to the longitudinal central axis 20 of cylindrical transmission housing 7 which is opposite to the sense or hand and angle of the helical cut of planet gears 2a of the first planet gear set. Thus, ring-like member 3a may be said to be a cylindrical shaped ring gear. The structure of cylindrical shaped ring gear 3a restrains it from movement in the axial direction toward the first end 21 of cylindrical transmission housing 7. The structure of cylindrical shaped ring gear 3a also prevents it from moving in the circumferential direction of the interior circumferential surface of the cylindrical transmission housing 7. The gear teeth of ring gear 3a engage the gear teeth of the planet gears 2a of the first set of planet gears. It will be appreciated that cylindrical shaped ring gear 3a could be a separate machined cylindrical member which is connected to the interior circumferential surface of cylindrical transmission housing 7, e.g., by bolting.

In the embodiment illustrated in FIG. 1, cylindrical ring shaped gear 3d is similar to cylindrical ring shaped gear 3a with the helical cut of cylindrical ring shaped gear 3d having a sense or a hand and an angle with respect to the longitudinal central axis 20 of cylindrical transmission housing 7 which is opposite to the sense or the hand and the angle of the helical cut of planet gears 2d of the fourth planet gear set. It will be apparent that in the embodiment illustrated in FIG. 1, the sense or the hand and the angle of the helical cut of cylindrical shaped ring gear 3d is opposite to the sense or the hand and the angle of the helical cut of cylindrical shaped ring gear 3a. In the embodiment illustrated in FIG. 1, cylindrical shaped ring gear 3d is restrained from axial movement in the direction toward the second end 22 of cylindrical transmission housing 7. Cylindrical shaped ring gear 3d is also restrained from movement in the circumferential direction of cylindrical transmission housing 7.

FIG. 1 further illustrates cylindrical shaped ring gears 3b and 3c. These cylindrical shaped ring gears 3b and 3c are machined on the interior circumferential surface of a cylindrical unit 8.

The interior circumferential surface of cylindrical shaped ring gear 3b has a helical cut with a sense or a hand and an angle with respect to the longitudinal central axis 20 of cylindrical transmission housing 7 which is opposite to the sense or the hand and angle of the helical cut of planet gears 3b of the second planet gear set. It will be appreciated that the sense or the hand and the angle of the helical cut of cylindrical shaped ring gear 3b is opposite to the sense or the hand and the angle of the helical cut of cylindrical shaped ring gear 3a.

The interior circumferential surface of cylindrical shaped ring gear 3c has a helical cut with a sense or a hand an angle with respect to the longitudinal central axis 20 of cylindrical transmission housing 7 which is opposite to the sense or the hand and the angle of the helical cut of planet gears 3c of the third planet gear set. It will be appreciated that the sense or the hand and the helical cut of cylindrical shaped ring gear 3c is opposite to the sense or the hand and the angle of cut of cylindrical shaped ring gear 3d and cylindrical shaped ring gear 3b.

Cylindrical unit 8, along with integral cylindrical shaped ring gear 3b and cylindrical shaped ring gear 3c, in the embodiment illustrated in FIG. 1, is mounted on the interior surface of cylindrical transmission housing 7 for axial movement in the direction of the longitudinal central axis 20 by a splined mounting. As illustrated in FIG. 2, the splined teeth of the outer surface of cylindrical member 8, including cylindrical shaped ring gears 3b, 3c, engage splined teeth on an interior surface of cylindrical transmission housing 7. That is, the outer surface of the cylindrical wall of cylindrical unit 8 is fitted with a spline surface. The inner cylindrical wall of cylindrical transmission housing 7 adjacent cylindrical unit 8 is fitted with a mating spline surface. The splined connection permits axial movement of cylindrical unit but prevents circumferential movement of cylindrical unit 8 with respect to cylindrical transmission housing 7.

In the embodiment wherein rotation and the helical cut creates forces forcing cylindrical shaped ring gear 3b and cylindrical shaped ring gear 3c to tend to move toward one another, the portion of cylindrical unit 8 located between cylindrical shaped ring gear 3b and cylindrical shaped ring gear 3c transmits these forces in a direction parallel to the longitudinal central axis 20 and restrains ring gear 3b and ring gear 3b from moving together. As will hereinafter be discussed, in the embodiment wherein forces force ring gears 3b, 3c to tend to move toward one another, cylindrical shaped ring gear 3b and cylindrical shaped ring gear 3c move together in the direction of longitudinal central axis 20 on the splined mounting to balance load transmission between ring gear 3b and ring gear 3c and respective planet gears 2b of the second planet gear set and planet gears 2c of the third planet gear set.

It will be appreciated that cylindrical shaped ring gear 3b and cylindrical shaped ring gear 3c may each be a separate machined cylindrical member splined to the interior circumferential surface of cylindrical transmission housing 7 for axial movement in the direction of longitudinal central axis 20. In such a case, in the embodiment illustrated in FIG. 1, a separate machined cylindrical element would be disposed between separate cylindrical ring shaped gear 3c and separate cylindrical ring shaped gear 3d. This separate machined cylindrical element would also be splined to the interior circumferential surface of cylindrical transmission housing 7 for axial movement in the direction of longitudinal central axis 20. It will also be appreciated that other mechanisms, in addition to splining, could be provided to mount cylindrical shaped ring gears and intermediate members to the interior circumferential surface of cylindrical transmission housing 7 for axial movement in the direction of longitudinal central axis 20 and prevent circumferential movement with respect to the cylindrical transmission housing 7.

Operation of the embodiment illustrated in FIG. 1 will be explained for the embodiment where rotational power is inputted in the clockwise direction at arm members 9 of planet gear carrier 4 and rotational power is outputted by sun shaft 5 at second end 22 of cylindrical transmission housing 7. In this embodiment, the transmission would be a speed increase transmission.

Rotation of planet gear carrier 4 in the clockwise direction by a rotational power input source (not illustrated) would cause planet gear sets 2a, 2b, 2c and 2d to rotate in respective cylindrical shaped ring gears 3a, 3b, 3c and 3d and further cause rotation of each planet gear of the planet gear sets. Cylindrical shaped ring gears 3a, 3b, 3c and 3d, engaged with respective planet gears of planet gear sets 2a, 2b, 2c and 2d, do not rotate because cylindrical shaped ring gears 3a, 3b, 3c and 3d are mounted to be restrained from rotation in the circumferential direction of cylindrical transmission housing 7.

Rotation of the planet gears of planet gear sets 2a, 2b, 2c and 2d, engaging sun gears 1a, 1b, 1c and 1d, results in rotation of sun gears 1a, 1b, 1c and 1d.

Rotation of sun gears 1a, 1b, 1c, and 1d, splined to sun shaft 5, results in rotation of sun shaft 5 and the transmission of rotational power or torque to sun shaft 5. In this embodiment, sun shaft 5 is a driven shaft.

Load sharing or load balancing amongst the gears occurs as follows. Helical gears, due to the angle of the helical cut, experience axial thrust when loaded. The magnitude of this axial thrust is directly proportional to the torque load on the gear. Power sharing between planetary sets results from this thrust reaction and consequent axial movement of sun gears and ring gears. That is, if one planetary set is more heavily loaded than the others, the axial thrust on the helical sun gear and the helical ring gear of that set is not balanced with the thrust loads on the helical sun gear and helical ring gear of the other planetary sets. The sun gear and/or the ring gear that is more heavily loaded moves axially in response to this load imbalance, as described in detail below, to ultimately result in load balancing or load sharing.

An example of load balancing or load sharing, in accordance with the present invention, is as follows. If due to manufacturing tolerances, the gears of planetary set "a" engage before the gears of the other three planetary sets of the embodiment illustrated in FIG. 1, the torque load it experiences results in an axial thrust load on both sun gear 1a and cylindrical shaped ring gear 3a. In the above described embodiment, where rotational power is inputted to planet gear carrier 4 in the clockwise direction, the thrust load on sun gear 1a is directed to the second end 22 of cylindrical transmission housing 7 and the thrust load on ring gear 3a is directed to the first end 21 of cylindrical transmission housing 7. Since planetary set "b" is not experiencing as much load, there is not an equal and opposite thrust axial thrust on sun gear 1b. The imbalance in axial thrust, due to the imbalance in load, causes sun gear 1a to move on sun shaft 5 toward the second end 22 of cylindrical transmission housing 5. Sun gear 1a thus pushes sun gear 1b in the axial direction on sun shaft 5 via cylindrical member 10 toward second end 22 of cylindrical transmission housing 5. This axial movement of sun gear 1a due to axial thrust resulting from the helical gear cut results in sun gear 1a and hence the entire planetary set "a" to become less loaded, while at the same time forces sun gear 1b, and hence the entire planetary set "b", to become more loaded. As sun gear 1b becomes loaded, the helical cut on sun gear 1b results in an axial thrust on sun gear 1b in the direction toward the first end 21 of cylindrical transmission housing 7.

As sun gear 1b becomes more loaded, the torque transmitted by sun gear 1b to ring gear 3b via planet gears 2b increases the load on ring gear 3b. The helical cut on ring gear 3b results in an axial thrust on ring gear 3b proportional to the loading in the axial direction toward the second end 22 of cylindrical transmission housing 7. If planetary set "c" is not yet loaded or is less loaded that planetary set "b", the axial thrust exerted by ring gear 3b forces cylindrical unit 8, and thereby ring gear 3c, to axially move, along with ring gear 3b, toward the second end 22 of cylindrical transmission housing 7. This results in ring gear 3c becoming more loaded.

As ring gear 3c becomes more loaded, it transmits more load, via planet gears 2c, to sun gear 1c. Also as ring gear 3c becomes more loaded, it develops more axial thrust in the direction toward the first end 21 of cylindrical transmission housing 21.

As sun gear 1c becomes more loaded, it exerts a greater thrust toward the second end 22 of cylindrical transmission housing 7. If sun gear 1d is not loaded or less loaded than sun gear 1c, sun gear 1c will move on sun shaft 5 in the axial direction toward second end 22 of cylindrical transmission housing 7. Sun gear 1c thus pushes sun gear 1d via cylindrical member 10 toward the second end 22 of transmission housing 7. This causes sun gear 1d to become more loaded and sun gear 1c to become less loaded.

As sun gear id becomes more loaded, it transmits more load to ring gear 3d via planet gears 2d. In addition, as sun gear 1d becomes more loaded it exerts a greater axial thrust in the direction toward the first end 21 of cylindrical transmission housing 7, with the axial thrust exerted by sun gear 1d again being proportional to the load on sun gear 1d.

In the described embodiment illustrated in FIG. 1, the axial thrust developed by ring gear 3a will tend to cause ring gear 3a to move toward to the first end 21 of cylindrical transmission housing 7. In the illustrated embodiment of FIG. 1, ring gear 3a does not move toward the first end 21 of cylindrical transmission housing 7 because ring gear 3a is an integral machined member on the interior circumferential surface of the cylindrical transmission housing 7. It will be appreciated that cylindrical shaped ring gear 3a could be, for example, a separate cylindrical ring shaped member splined to the interior circumferential surface of cylindrical transmission housing 7 for axial movement in the direction of longitudinal central axis 20. In this instance, a stop member would be provided to restrain axial movement of such a ring gear 3a in the axial direction toward first end 21 of cylindrical transmission housing 7.

In the described embodiment illustrated in FIG. 1, the axial thrust developed by ring gear 3d will tend to cause ring gear 3d to move toward the second end 22 of cylindrical transmission housing 7. In the illustrated embodiment of FIG. 1, ring gear 3d does not move toward the second end 22 of the cylindrical transmission housing 7 because ring gear 3d is also an integral machined member on the interior circumferential surface of the cylindrical transmission housing 7. As with cylindrical shaped ring gear 3a, it will be appreciated that cylindrical ring gear 3d could be, for example, a separate cylindrical ring shaped member splined to the interior circumferential surface of cylindrical transmission housing 7, with a stop member provide to restrain axial movement of such a ring gear 3d toward the second end 22 of cylindrical transmission housing 7.

The above-described loading and thrusts, with the thrusts being proportional to the loading, continues until sun gears 1a and 1b, ring gears 3b and 3c, and sun gears 1c and 1d move as pairs in the axial direction so as to balance load transmitted by all gears. The load transmission amongst gears is self balancing and self compensating.

As can be seen from the above description, any imbalance in the torque among the planetary sets results in an imbalance in lateral thrust of the various sun gears and ring gears. This imbalance in thrusts results in these gears moving in the axial direction in response to the direction of the imbalance of thrust. This axial movement will continue until all the thrusts are balanced. When the thrust forces are balanced, the torques or loads transmitted amongst the gears are also balanced.

The planet gears do not move axially during the operation of the transmission. The thrust on a planet gear due to interaction with a respective sun gear is equal and opposite to the thrust due to interaction with a respective ring gear. Hence, the axial forces acting on a planet gear are equal and opposite to one another. This results in no tendency for the planet gears to move in the axial direction.

Figure 4A:
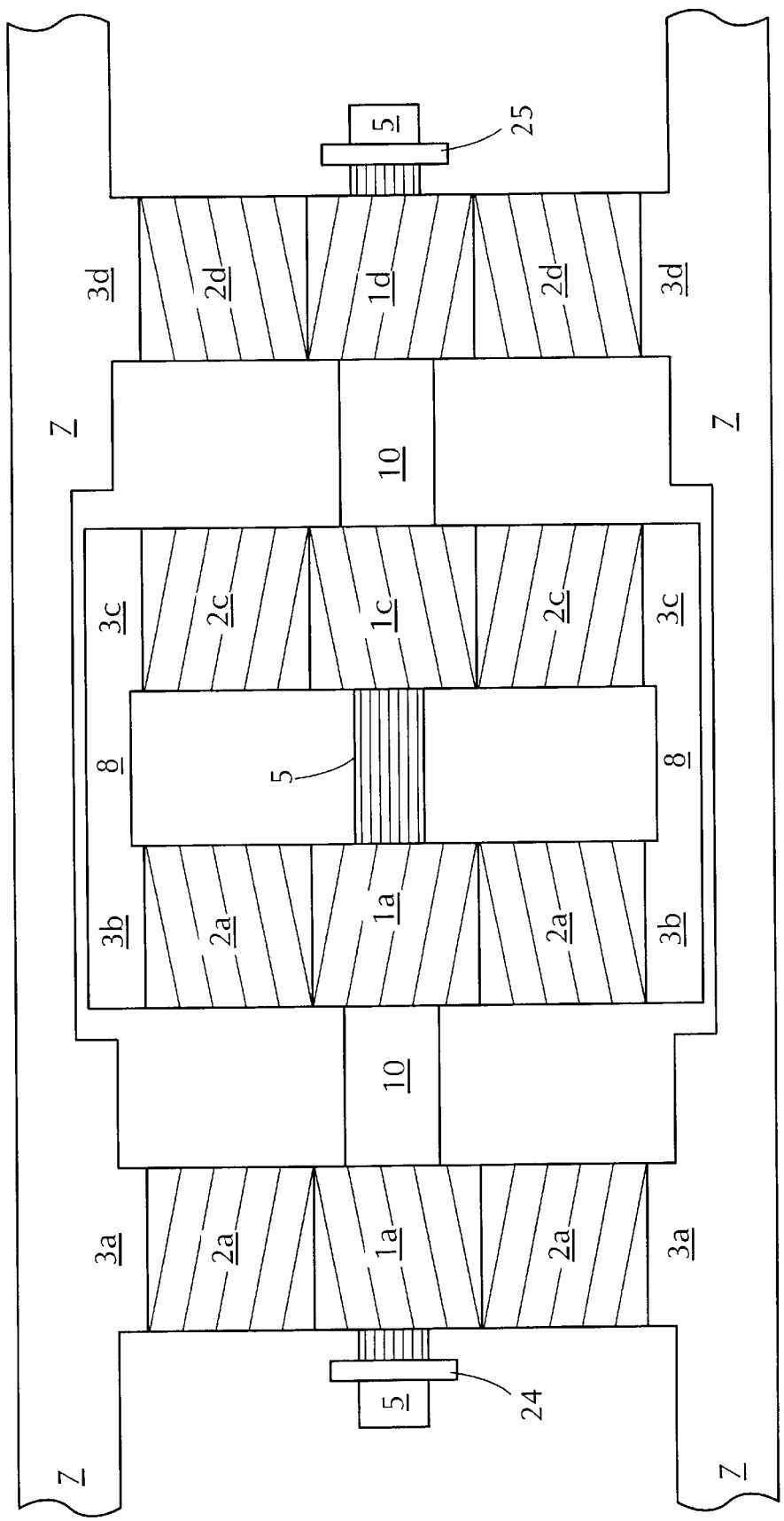
FIG. 4a is an illustrative schematic side elevation view of the planetary gear transmission in accordance with the embodiment of FIG. 1 with additional parts removed illustrating gear locations prior to start up.
Figure 4B:
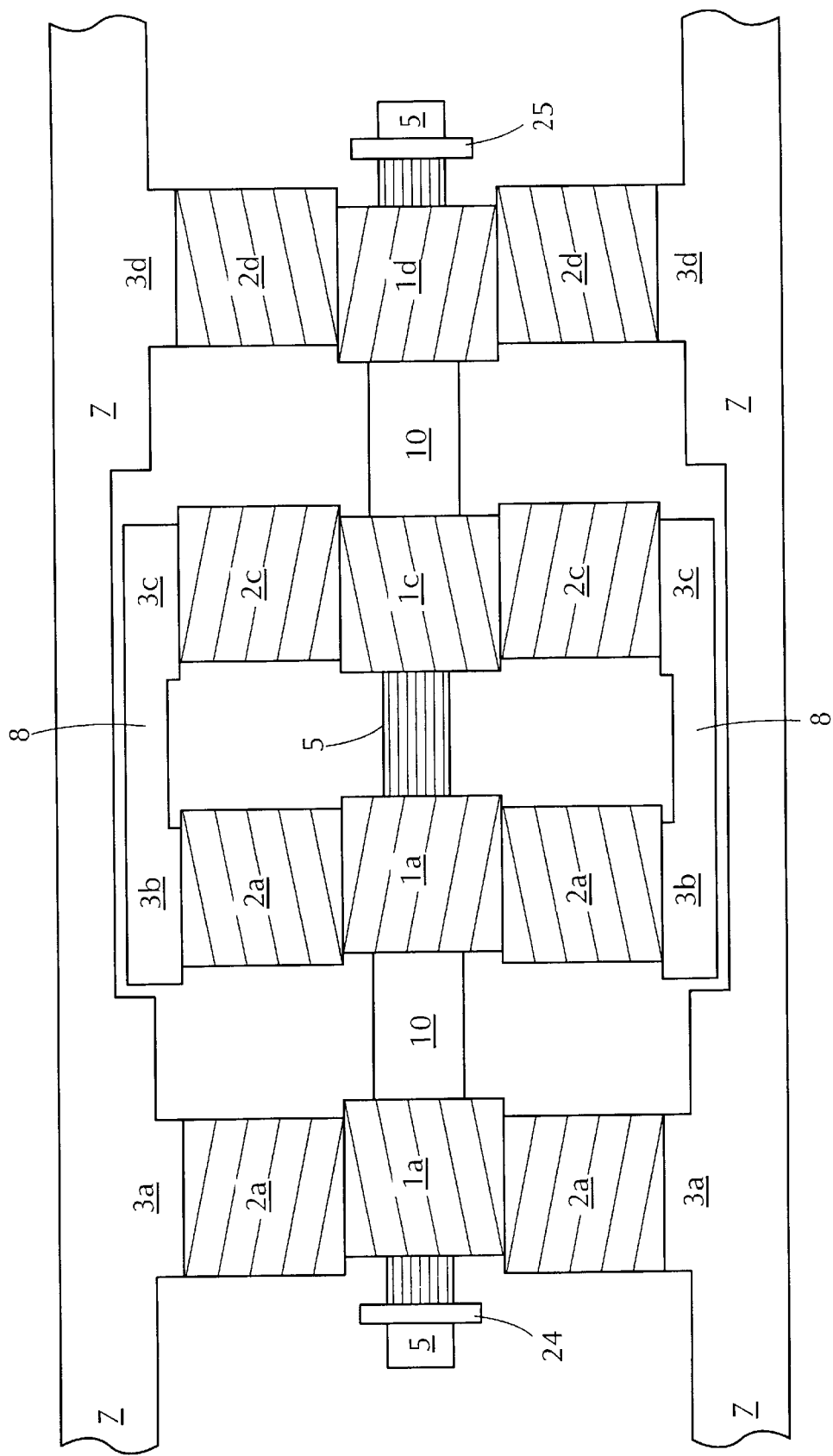
FIG. 4b is an illustrative schematic side elevation view of the planetary gear transmission in accordance with the embodiment of FIG. 1 with additional parts removed illustrating gear locations at equilibrium load sharing.

FIG. 4a is a schematic illustration of the described embodiment of FIG. 1 illustrating an example of gear locations prior to start up or prior to rotating planet gear carrier 4. FIG. 4b is a schematic illustration of the described embodiment of FIG. 1 illustrating an example of gear locations after start up when equilibrium load sharing or balanced load amongst gears has been achieved. It will be appreciated that a plurality of planetary gear sets employing the principles of the present invention may be used as dictated by the design criteria for the transmission.

Figure 5:
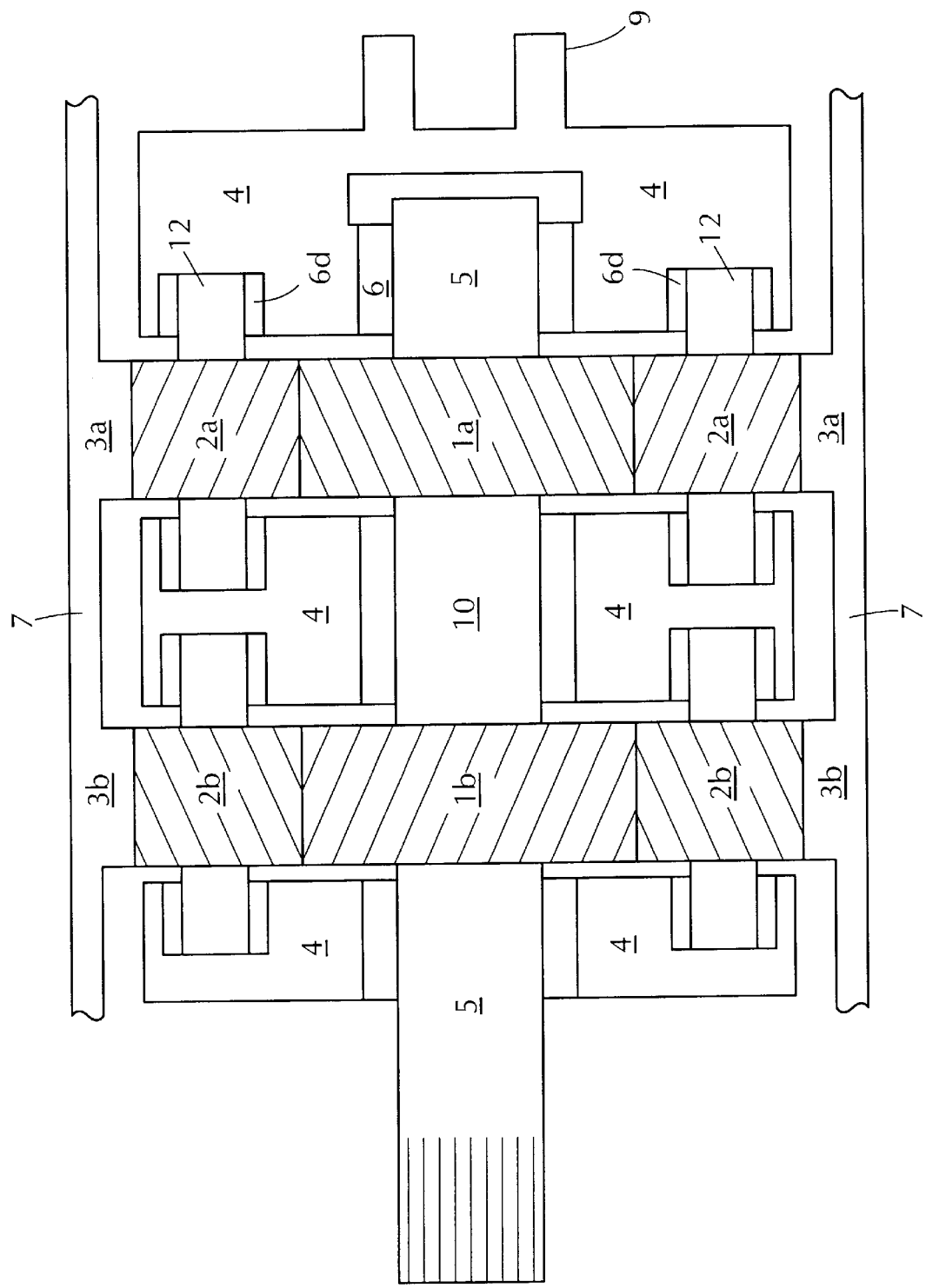
FIG. 5 is an illustrative schematic side elevation view of a planetary gear transmission in accordance with another embodiment of the present invention similar to that of FIG. 1 with parts removed for purposes of clarity of understanding illustrating a planetary transmission with two helical gear sets.

FIG. 5 is a schematic illustration of an embodiment similar to FIG. 1 wherein there are only two planetary gear sets. The principles of operation of the present invention would be the same.

If sun shaft 5 were the drive shaft and rotational power was inputted to sun shaft 5 by a power source (not illustrated) to rotate sun shaft 5 in the counterclockwise direction, operation would take place as previously described in connection with FIG. 1 wherein planet gear carrier 4 is rotated in the clockwise direction by a power source. If sun shaft 5 is the drive shaft and planet carrier 4 is the driven member, the transmission becomes a speed reducing transmission.

If in the embodiment illustrated in FIG. 1, planet gear carrier 4 was rotated by a power source in the counterclockwise direction, i.e., the input torque rotational direction of planet gear carrier 4 is counterclockwise, the power sharing characteristics, in accordance with the present invention, would be the same. The following described modification would be made to the embodiment illustrated in FIG. 1.

If planet gear carrier 4 was rotated in the counterclockwise direction by the outside power source, in the embodiment of FIG. 1, the thrusts created by the helical cut on the gears would cause sun gears 1a and 1b to tend to move apart in the axial direction of sun shaft 5 and cause sun gears 1c and 1d to tend to move apart in the axial direction of the sun shaft 5. Likewise, sun gear 1b and sun gear 1c would tend to move toward one another in the axial direction of the sun shaft 5. Thus, cylindrical member 10, or some other type of spacer, would be placed between sun gear 1b and sun gear 1c.

In the embodiment of FIG. 1 wherein planet carrier 4 is rotated in the counterclockwise direction, ring gears 3a and 3b would tend to move together in the axial direction of the cylindrical transmission housing and ring gears 3c and 3d would tend to move together in the axial direction of the cylindrical transmission housing. In such an embodiment, ring gears 3a and 3b could be a spline mounted unit such as the spline mounted ring gear unit 3b, 8, 3c illustrated in FIG. 1. Likewise, in such an embodiment, ring gears 3c and 3d could be such a spline mounted unit. Alternatively, each of cylindrical shaped ring gears 3a, 3b, 3c and 3d could be a separate cylindrical member each splined to the interior circumferential surface of cylindrical transmission housing 7 with a spacer member disposed between ring gears 3a and 3b and another spacer member disposed between ring gears 3c and 3d.

In the embodiment of FIG. 1 wherein planet carrier 4 is rotated counterclockwise, a stop member 24 would be mounted at the end of sun shaft 5 adjacent the first end 21 of cylindrical transmission housing 7 to restrain axial movement of sun gear 1a in the axial direction toward the first end 21 of cylindrical transmission housing 7 and maintain sun gear 1a in engagement with planet gears 2a. Similarly, a stop member 25 would be provided at the second end of sun shaft 5 to restrain axial movement of sun gear 1d toward the second end 22 of cylindrical transmission housing 7.

As previously stated, if planet carrier 4 was rotated in the counterclockwise direction, the power sharing characteristics and principles of operation of the present invention would be the same as previously described.

In practical embodiments, the distance of axial movement of sun gears or ring gears in the practice of the present invention would be, for example, about 0.1 mm to 1 mm.

It will be appreciated that one skilled in the art will be able to devise numerous mechanical variations employing the principles of the present invention described herein.

The present invention provides for a commercially practical, cost-effective planetary gear transmission having multiple planetary gear sets in the gear train by employing helical cut gears. The helical cut gears used in the planetary gear transmission of the present invention need only have commercially practical, cost-effective manufacturing tolerances.

Although preferred embodiments of the present invention have been described in detail, it is apparent that modifications may be made by those skilled in the art within the spirit and the scope of the present invention as defined in the claims.

What is claimed is:

1. A planetary gear transmission comprising:
   a cylindrical transmission housing having a longitudinal central axis, a first end and a second end;
   a planet gear carrier mounted for rotation within said transmission housing carrying a first set of rotatably mounted planet gears and a second set of rotatably mounted planet gears longitudinally spaced from said first set of planet gears toward said second end of said transmission housing;
   said planet gears of said first set each having a helical cut with a same sense and a same angle;
   said planet gears of said second set each having a helical cut with a same sense and a same angle opposite to the sense and the angle of the helical cut of said planet gears of said first set;
   a first cylindrical shaped ring gear disposed on said transmission housing and mounted for movement in a direction of said longitudinal central axis of said transmission housing and restrained from circumferential movement in a circumferential direction of said transmission housing;
   said first cylindrical shaped ring gear having a helical cut with a sense and an angle opposite to the sense and the angle of said helical cut of said planet gears of said first set;
   said planet gears of said first set engaging said first ring gear for rotation in said first ring gear upon rotation of said planet gear carrier;
   a second cylindrical shaped ring gear disposed on said transmission housing and mounted for movement in the direction of the longitudinal central axis of said transmission housing and restrained from circumferential movement in the circumferential direction of said transmission housing;
   said second cylindrical shaped ring gear having a helical cut with a sense and an angle opposite to the sense and the angle of the helical cut of said planet gears of said second set;
   said planet gears of said second set engaging said second ring gear for rotation in said second ring gear upon rotation of said planet gear carrier;
   a first ring gear member disposed between said first cylindrical shaped ring gear and said second cylindrical shaped ring gear for transmitting force in the direction of the longitudinal central axis of said transmission housing between said first cylindrical shaped ring gear and said second cylindrical shaped ring gear;
   a sun gear shaft mounted for rotation within said transmission housing, said sun gear shaft having an axis parallel to and coincident with said longitudinal central axis of said transmission housing;
   said sun gear shaft having a first end adjacent to the first end of said transmission housing and a second end adjacent to the second end of said transmission housing;
   a first sun gear mounted on said sun gear shaft restrained from axial movement on said sun gear shaft toward said first end of said sun gear shaft and further mounted on said sun gear shaft for transmission of rotational power between said first sun gear and said sun gear shaft;
   said first sun gear having a helical cut with a sense and an angle opposite to the sense and the angle of the helical cut of said planet gears of said first set;
   said first sun gear engaging said planet gears of said first set for transmitting rotational power between said first sun gear and said planet gears of said first set;
   a second sun gear mounted on said sun gear shaft restrained from axial movement on said sun gear shaft toward said second end of said sun gear shaft and further mounted on said sun gear shaft for transmission of rotational power between said second sun gear and said sun gear shaft;
   said second sun gear having a helical cut with a sense and angle opposite to the sense and the angle of the helical cut of said planet gears of said second set;
   said second sun gear engaging said planet gears of said second set for transmitting rotational power between said second sun gear and said planet gears of said second set;
   the respective helical cuts on said first cylindrical shaped ring gear and said second cylindrical shaped ring gear having senses and angles whereby rotation of said planet gears of said first set and said planet gears of said second set engaging respectively said first cylindrical shaped ring gear and said second cylindrical shaped ring gear establishes forces forcing said first cylindrical shaped ring gear and said second cylindrical shaped ring gear toward one another in the direction of the longitudinal central axis of said transmission housing.

2. A planetary gear transmission according to claim 1 further comprising:

said planet gear carrier carrying a third set of rotatably mounted planet gears longitudinally spaced from said second set of planet gears toward said second end of said transmission housing;

said planet gears of said third set each having a helical cut with a same sense and a same angle opposite to the sense and the angle of the helical cut of said planet gears of said second set;

a third cylindrical shaped ring gear disposed on said transmission housing and restrained from movement in the direction of said longitudinal central axis of said transmission housing toward said second end of said transmission housing and restrained from circumferential movement in the circumferential direction of said transmission housing, said third cylindrical shaped ring gear having a helical cut with a sense and an angle opposite to the sense and the angle of said helical cut of said planet gears of said third set;

said planet gears of said third set engaging said third ring gear for rotation in said third ring gear upon rotation of said planet gear carrier;

a third sun gear mounted on said sun gear shaft for axial movement on said sun gear shaft and further mounted on said sun gear shaft for transmission of rotational power between said third sun gear and said sun gear shaft;

said third sun gear having a helical cut with a sense and an angle opposite to the sense and the angle of the helical cut on said planet gears of said third set;

said third sun gear engaging said planet gears of said third set for transmitting rotational power between said third sun gear and said planet gears of said third set;

said second sun gear mounted on said sun gear shaft for axial movement on said sun gear shaft;

a first sun gear member disposed between said second sun gear and said third sun gear for transmitting force in the direction of said sun gear shaft axis between said second sun gear and said third sun gear.

3. A planetary gear transmission according to claim 1 further comprising:

said planet gear carrier carrying a third set of rotatably mounted planet gears longitudinally spaced from said second set of planetary gears toward said second end of said transmission housing;

said planet gears of said third set each having a helical cut with a same sense and a same angle opposite to the sense and the angle of the helical cut of said planet gears of said second set;

a third cylindrical shaped ring gear disposed on said transmission housing and mounted for movement in the direction of said longitudinal central axis of said transmission housing and restrained from circumferential movement in the circumferential direction of said transmission housing;

said third cylindrical shaped ring gear having a helical cut with a sense and an angle opposite to the sense and the angle of said helical cut of said planetary gears of said third set;

said planet gears of said third set engaging said third ring gear for rotation in said third ring gear upon rotation of said planet gear carrier;

a third sun gear mounted on said sun gear shaft for axial movement on said sun gear shaft and further mounted on said sun gear shaft for transmission of rotational power between said third sun gear and said sun gear shaft;

said third sun gear having a helical cut with a sense and an angle opposite to the sense and the angle of the helical cut of said planet gears of said third set;

said third sun gear engaging said planet gears of said third set for transmitting rotational power between said third sun gear and said planet gears of said third set;

said planet gear carrier carrying a fourth set of rotatably mounted planet gears longitudinally spaced from said third set of planet gears toward said second end of said transmission housing;

said planet gears of said fourth set each having a helical cut with a same sense and a same angle opposite to the sense and the angle of the helical cut of said planet gears of said third set;

a fourth cylindrical shaped ring gear disposed on said transmission housing and mounted for movement in the direction of the longitudinal central axis of said transmission housing and restrained from circumferential movement in the circumferential direction of said transmission housing;

said fourth cylindrical shaped ring gear having a helical cut with a sense and an angle opposite to the sense and the angle of the helical cut of said planet gears of said fourth set;

said planet gears of said fourth set engaging said fourth ring gear for rotation in said fourth ring gear upon rotation of said planet gear carrier;

a second ring gear member disposed between said third cylindrical shaped ring gear and said fourth cylindrical shaped ring gear for transmitting force in the direction of said longitudinal central axis of said transmission housing between said third cylindrical shaped ring gear and said fourth cylindrical shaped ring gear;

a fourth sun gear mounted on said sun gear shaft restrained from axial movement on said sun gear shaft toward said second end of said sun gear shaft and further mounted on said sun gear shaft for transmission of rotational power between said fourth sun gear and said sun gear shaft;

said fourth sun gear having a helical cut with a sense and an angle opposite to the sense and the angle of the helical cut on said planet gears of said fourth set;

said fourth sun gear engaging said planet gears of said fourth set for transmitting rotational power between said fourth sun gear and said planet gears of said fourth set;

said second sun gear mounted on said sun gear shaft for axial movement on said sun gear shaft;

a first sun gear member disposed between said second sun gear and said third sun gear for transmitting force in the direction of said sun gear shaft axis between said second sun gear and said third sun gear;

the respective helical cuts on said second sun gear and said third sun gear having senses and angles whereby rotation of said second sun gear and said third sun gear engaging respectively planet gears of said second set and planet gears of said third set establishes forces forcing said second sun gear and said third sun gear toward one another in the axial direction of said sun gear shaft;

the respective helical cuts on said third cylindrical shaped ring gear and said fourth cylindrical shaped ring gear having senses and angles whereby rotation of planet gears of said third set and planet gears of said fourth set engaging respectively said third cylindrical shaped ring gear and said fourth cylindrical shaped ring gear establishes forces forcing said third cylindrical shaped ring gear and said fourth cylindrical shaped ring gear toward one another in the direction of the longitudinal central axis of said transmission housing.

4. A planetary gear transmission according to claim 1 further comprising:

said planet gear carrier carrying a plurality of sets of rotatably mounted helical cut planet gears;

a plurality of cylindrical shaped helical cut ring gears disposed on said transmission housing;

said plurality of sets of helical cut planet gears engaging respective cylindrical shaped helical cut ring gears for rotation therein upon rotation of said planet gear carrier;

a plurality of helical cut sun gears mounted on said sun gear shaft for transmission of rotational power between said sun gears and said sun gear shaft and said sun gears engaging respective sets of helical cut planet gears for transmitting rotational power between respective helical cut sun gears and respective sets of helical cut planet gears.

5. A method for transmitting rotational power with a planetary gear transmission comprising:

providing a cylindrical transmission housing having a longitudinal axial direction;

providing two planetary gear sets in said cylindrical transmission housing with each planetary gear set comprising a plurality of helical cut planet gears disposed in a planet gear carrier, a helical cut ring gear disposed on said transmission housing, and a sun gear disposed on a sun gear shaft mounted parallel to the longitudinal axial direction of the cylindrical transmission housing;

causing each helical cut planet gear of each planetary gear set to engage the respective helical cut ring gear and the respective helical cut sun gear;

mounting the helical cut ring gear of the two planetary gear sets on the transmission housing for longitudinal axial direction movement on the transmission housing;

applying torque to the planetary gear transmission resulting in longitudinal axial direction movement of said helical cut ring gears mounted for longitudinal axial direction movement, thereby resulting in equal load sharing between said two planetary gear sets.

* * * * *